(12) United States Patent
Rudakov

(10) Patent No.: US 11,480,135 B2
(45) Date of Patent: Oct. 25, 2022

(54) METHOD FOR CREATING ENGINE THRUST

(71) Applicant: Aleksandr Rudakov, Voronezh (RU)

(72) Inventor: Aleksandr Rudakov, Voronezh (RU)

( * ) Notice: Subject to any disclaimer, the term of this patent is extended or adjusted under 35 U.S.C. 154(b) by 425 days.

(21) Appl. No.: 15/370,443

(22) Filed: Dec. 6, 2016

(65) Prior Publication Data

US 2017/0184054 A1  Jun. 29, 2017

(51) Int. Cl.
 *F02K 9/44* (2006.01)
 *F02K 9/97* (2006.01)
 *F02K 9/42* (2006.01)

(52) U.S. Cl.
 CPC .......... *F02K 9/44* (2013.01); *F02K 9/42* (2013.01); *F02K 9/97* (2013.01)

(58) Field of Classification Search
 CPC ..... F02K 9/28; F02K 9/44; F02K 9/66; F02K 9/82; F02K 9/97
 USPC ................. 244/23 A, 23 C, 23 R
 See application file for complete search history.

(56) References Cited

U.S. PATENT DOCUMENTS

| | | | | |
|---|---|---|---|---|
| 3,041,010 A | * | 6/1962 | Foster | B64C 39/026 244/12.2 |
| 3,312,068 A | * | 4/1967 | Sutor | F02K 9/62 60/258 |
| 3,717,999 A | * | 2/1973 | Wilson | F02K 9/52 60/258 |
| 4,644,745 A | * | 2/1987 | Wagner | F02K 9/62 60/258 |
| 5,622,046 A | * | 4/1997 | Michaels | F02K 9/52 239/404 |

OTHER PUBLICATIONS

National Aeronautics and Space Administration, General Thrust Equation, Feb. 28, 2006, National Aeronautics and Space Administration (Year: 2006).*
Mager, Artur; Approximate Solution of Isentropic Swirling Flow Through a Nozzle; Dec. 1960; ARS Journal (Year: 1960).*

(Continued)

*Primary Examiner* — Todd E Manahan
*Assistant Examiner* — Kyle Robert Thomas
(74) *Attorney, Agent, or Firm* — Emanus, LLC; Willie Jacques

(57) ABSTRACT

The invention is in the field of engine building technology and may be used in space technology or aviation. Liquid-propellant rockets with Laval nozzles are well known, and they have the following insufficiencies: (1) high fuel consumption rates, which lead to increased dimensions and engine weight and boosters; (2) a relatively low combustion efficiency, because the low mass of the combustion products are emitted into the environment; (3) the large length of the de Laval nozzles with increased expansion ratios increase the dimensions and the engine weight; (4) use of high temperature rocket propellants—combustion products—in the camera and de Laval nozzle. These insufficiencies suppress using liquid-propellant rockets in space technology. The goal of the invention is decreasing the influence of these insufficiencies and obtaining an engine with improved efficiency. The goal is achieved with the creation of an engine with the subsonic discharge of combustion products and the creation of a simple nozzle construction.

2 Claims, 3 Drawing Sheets

(56) References Cited

OTHER PUBLICATIONS

Dutton, J. C., Swirling Supersonic Nozzle Flow, 1987, American Institute of Aeronautics and Astronautics, Inc. (Year: 1987).*
Braeunig, Robert, Rocket Propulsion, Aug. 8, 2012, (Year: 2012).*
Greene, William, J-2X Extra: The Rocket Engine Development Life Cycle, Jun. 20, 2011, NASA (Year: 2011).*

* cited by examiner

METHOD FOR CREATING ENGINE THRUST

CROSS-REFERENCE TO RELATED APPLICATIONS

This application claims the priority and benefit of Russian Patent Application Serial Number 2015157084/06 filed Dec. 29, 2015.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO AN APPENDIX SUBMITTED ON A COMPACT DISC AND AN INCORPORATED BY REFERENCE OF THE MATERIAL ON THE COMPACT DISC

Not applicable.

STATEMENT REGARDING PRIOR DISCLOSURES BY THE INVENTOR OR A JOINT INVENTOR

Reserved for a later date, if necessary.

BACKGROUND OF THE INVENTION

Field of Invention

The disclosed subject matter is in the field of engine building technology for space technology or aviation.

Background of the Invention

Generally, known engines with de Laval nozzles are widely used in domestic and foreign rockets of various classes. Surveys and accounts of these engines have been provided in a number of literary sources, such as: "Foreign Rocket Engines," Reference Guide, Central Institute of Aviation Motors 1967; "Liquid-Propellant Rockets Using Oxygen and Kerosene," Survey No. 195, GONTI-3, 1964; "Foreign Military Survey," Nos. 5 and 6, 2001; Writings of the Scientific Development and Production Center Energo-Mash, Vol. 21 (Moscow 2003); E. B. Volkov et al., *Liquid-Propellant* Rocket (Moscow: Voenizdat, 1970).

An insufficiency of the method for creating thrust in the above-listed analogues is the relatively low combustion efficiency, which leads to large sizes and engine weight. The method for creating thrust is characteristic for all types of liquid-propellant rockets and is set forth in detail in the book written by V. E. Alemasov, et al., *Theory of Rockets* (Moscow: Mashinostroeniye, 1969). Its essence is as follows. The flow of the liquid propellant has a plane-parallel movement in the nozzle cavity axially and races out of the chamber to the nozzle exit, passing through critical speed. The primary portion of the thrust in this case is determined by the expenditure and speed of the intersection at the nozzle exit.

An additional portion of the thrust is determined by the area of the exit and pressure on the exit. It is insignificant, comprising only approximately 3.7% of the primary portion of the thrust of the engine in a vacuum. The following are its insufficiencies: (1) high fuel consumption rates increase the sizes and masses of the constructions; (2) a relatively low combustion efficiency, because the large mass of the combustion products at a high temperature are emitted into the environment; (3) utilizing high nozzle expansion rations generated by high exhaust velocities, which lead to an increase in the length and mass of the nozzle and the axial dimensions of the engine; (4) using high temperature rocket propellants—combustion products in the chamber and nozzle.

SUMMARY OF THE INVENTION

In view of the foregoing, an object of this specification is to improve the efficiency of an engine.

BRIEF DESCRIPTION OF THE SEVERAL VIEWS OF THE DRAWINGS

Other objectives of the disclosure will become apparent to those skilled in the art once the invention has been shown and described. The manner in which these objectives and other desirable characteristics can be obtained is explained in the following description and attached figures in which.

Figure 1:
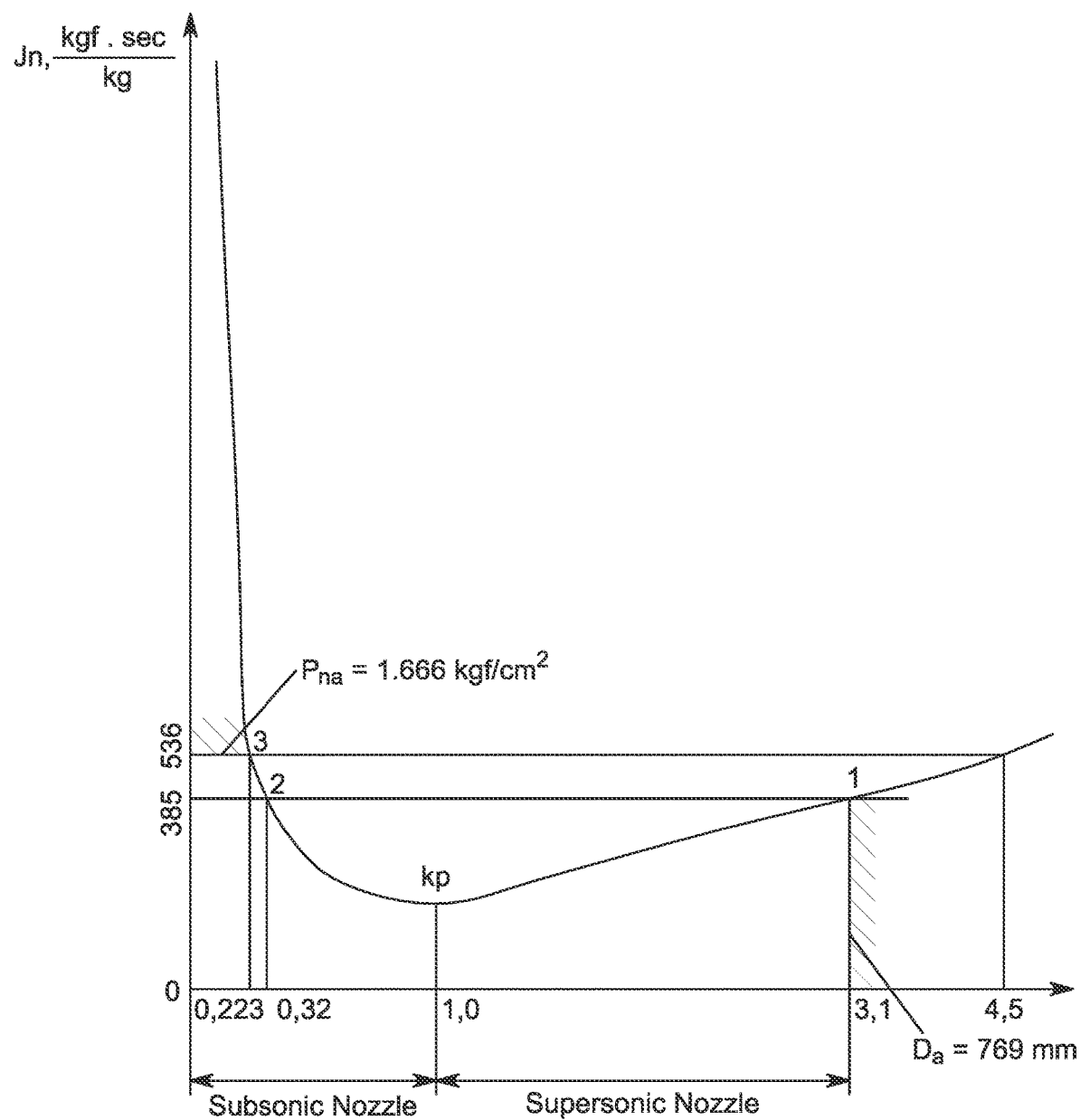
FIG. 1 is a graph of the dependency of the specific impulse of the thrust on the speed coefficient.

It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFFERED EMBODIMENTS

Disclosed is a method that is based on using the energy resources of fuel, which is distinctive in that the working medium enters into the nozzle tangentially with critical speed in a transverse direction and ensures that the flow is of a circular and rotating motion along the entire length of the nozzle, and the flow is slowed in the nozzle exit. Circular and axial velocity is created. Thanks to the centrifugal field, the tangential velocity creates excess pressure in the nozzle cavity, which, in conjunction with the area of the nozzle exit, creates the primary portion of the thrust. According to a known equation, the axial velocity creates additional thrust, which is less than the primary thrust.

In this manner, the proposed solution is different than the prior solution in that the primary thrust is created due to the area of the nozzle exit and pressure in it with the subsonic and vortex motion of the flow in the nozzle, and, the prior solution, at the expense of the fuel and high speed and temperature with the supersonic, plane-parallel, and axial discharge of the flow from the nozzle.

To simplify things, the following terms are used based on the character of the speed: for the prior solution—"supersonic engine," "supersonic nozzle," etc.; for the proposed solution—"subsonic engine," "subsonic nozzle," etc.

The theoretical justification for the creation of thrust at subsonic speeds of the discharge of the working medium was set forth by G. N. Abramovich in *Applied Gas Dynamics* (Moscow: Nauka, 1969). A graph of the dependency of the specific impulse of the thrust on the speed coefficient is provided in FIG. 1. $J=((k+1)/(2k))\times W_{kp}(\lambda+(1/\lambda))$, where: J—specific impulse of thrust; k—adiabatic ratio of expansion; $W_{kp}$—critical speed of the tangential input; $\lambda$—discharge—velocity coefficient. The following follows from FIG. 1: (a) the curved line $\lambda=1\div3,1$ is determined by the supersonic nozzle, and the line $\lambda=0\div1$ is determined by the subsonic nozzle; (b) the threshold value of the specific impulse of the thrust of the supersonic engine (Point 1) is limited by the diameter of the nozzle exit, and the subsonic engine (Point 3) is limited by the pressure in the nozzle exit; (c) in the subsonic implementation, it is possible to obtain a higher specific impulse of the thrust (Point 3). The calculations of the effectiveness confirm this. The effectiveness of the proposed implementation is evaluated via the comparative calculation based on known equations, which were set forth by G. N. Abromovich in his book:

1. Benchmark data of the supersonic engine prototype: $R_a=(\dot{m}_\alpha/g)\times W_a+P_a\times F_a=8,036$ kgf—engine thrust (fundamental equation); $\dot{m}_\alpha=20.89$ kg/sec—consumption through the engine; $W_a=3,644$ m/sec—speed at the nozzle exit; $W_{kp}=1,179$ m/sec—speed at critical; $P_a=594$ kgf/m2—pressure at the nozzle exit; $F_a=0.4642$ m2—area of the nozzle exit; $Z(\lambda\alpha)=\lambda_\alpha+(1/\lambda_\alpha)=3.41667$—gas-dynamic function; $\lambda_a=3.0934$—velocity coefficient at the nozzle exit.

2. The comparative equation $R_a=R_n=8,036$ kgf, $F_a=F_n=0.464$ m². The index "a" refers to a supersonic engine, and the index "n" refers to a subsonic engine.

3. The calculation of the range of variation of the pressure in the nozzle exit and the determination of the average pressure of the subsonic engine. The minimal pressure is calculated by the consumption $\dot{m}_{mna}=\dot{m}_a=20.89$ kg/sec and the discharge-velocity coefficient $Z(\lambda_{na})=\lambda_{na}+(1/\lambda_{na})$; $\lambda_{na}=0.323$; $W_{na}=380$ m/sec, where the index "na" signifies the parameter of the subsonic engine at the nozzle exit. $P_{na\ min}=(R_{na}/F_{na})-((\dot{m}_{na}\times\lambda_{na})/(gF_{na}))\times W_{na}=1.5566$; $(R_{na}/F_{na})-Pna=(\dot{m}_{na}/g)\times W_{na}$; $(R_{na}/F_{na})-P_{na}>0$. Maximum pressure $P_{na\ max}=(R_{na}/F_{na})=1.73115$ kgf/cm²—based on the equation $P_{na\ max}<(R_{na}/F_{na})$; $P_{avg}=((P_{na\ min}+P_{na\ max})/2)=1.6439$ kgf/cm².

4. Calculation of the coefficient of velocity $\lambda_{avg}$ at average pressure: $((R_{na})/(P_{na\ avg}\times F_{na}))=(1+\lambda^2_{na\ avg})/((1-((K-1)/(K+1))\times\lambda^2_{na\ avg})=1.0531$; $\lambda^2_{na\ avg}=0.0496$; $\lambda_{na\ avg}=0.223$; $W_{na\ avg}=263$ m/sec.

5. Calculation of the average consumption: $\dot{m}_{na\ avg}=(R_{na}-P_{na\ avg}\times F_a)/(\lambda_{na\ avg}\times W_{kp})\times g=15$ kg/sec. Decrease in consumption from using the subsonic engine −25%.

6. Check: $R_a=R_{na}=(\dot{m}_{na\ avg}/g)\times W_{na\ avg}+P_{na\ avg}\times F_{na}=8,033$ kgf (0.01%).

Therefore, it follows from the graph in FIG. 1 and the calculation of the effectiveness that for the same vacuum thrust and same area of the nozzle exit subsonic engine has lower fuel consumption and lower exhaust velocity at the nozzle exit. Physically, this is explained by the fact that the primary portion of the thrust of a subsonic engine is created by virtue of the area of the nozzle exit and pressure, not the consumption and velocity in a supersonic engine.

During development, the experience of the scientific research and experimental works were utilized. Furthermore, "cold" expulsions of the simplified nozzle model were conducted on the mounting in FIG. 4, which showed the necessity to continue the work.

Figure 4:
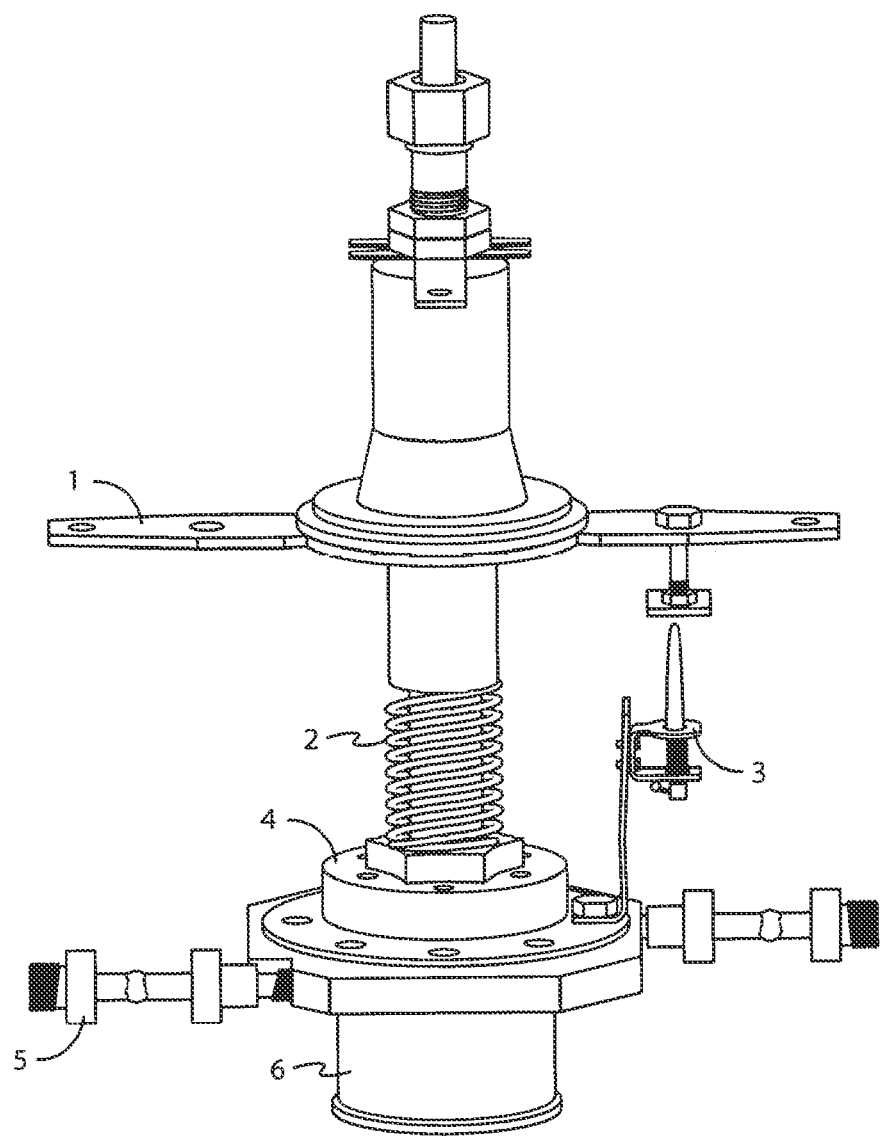

FIG. 4 is one embodiment of an assembly for measuring thrust. Referring to FIG. 4, the following are the components for an assembly measuring thrust: holder 401, spring 402, contact device 403, nozzle entrance 404, inlet 405, and nozzle exit 406.

Figure 2:
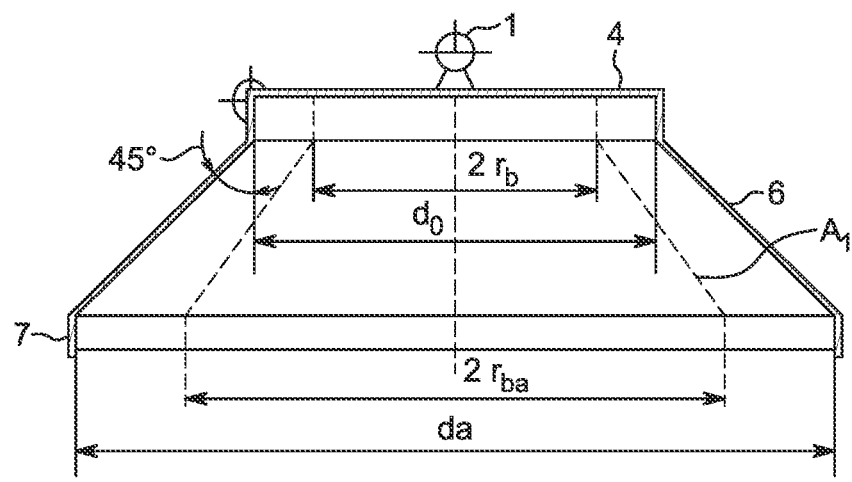
FIG. 2 is a mechanical diagram of the engine of the present invention.
Figure 3:
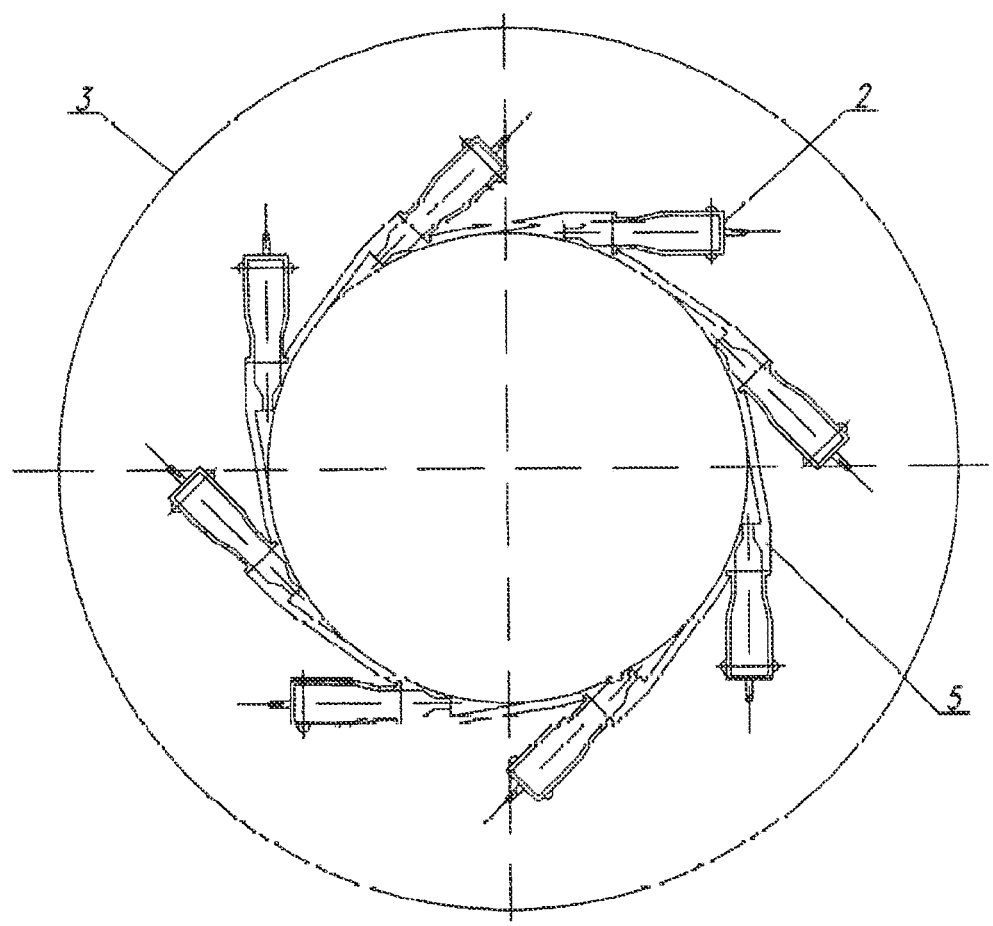
FIG. 3 is another mechanical diagram of the engine of the present invention; and, FIG. 4 is a perspective view of an assembly for measuring engine thrust.

The essence of the engine of the present invention is illustrated in the mechanical diagrams in FIGS. 2 and 3, where: $r_b$ and $r_{ba}$ are the radiuses of the vortex sheddings in the axial recirculation zones of the entrance and exit portions of the cone:

1—fuel delivery system;
2—assembly for forming the working medium;
3—nozzle;
4—nozzle entry;
5—inlet of the working medium into the nozzle;
6—mouth of the nozzle exit;
7—hollow cylinder of the nozzle exit;
$A_1$—zone of minimal pressure value in the nozzle cavity, which is equal to the pressure in the atmosphere.

In the disclosed invention, the majority of the parts can be used from an existing analogue, and for original parts, the nozzle 3 is constructively simplified and does not require significant expenses and additional manufacturing infrastructure.

Work of the gas to create engine thrust: the working medium enters into the nozzle entry 4 through the tangentially placed inlets 5 with critical speed and, twirling, moves with large tangential and small axial velocities. The twirling creates a centrifugal force field in the nozzle 3, which leads to the creation of excess pressure in the nozzle 3. Then, the stream enters into the cone shaped mouth 6 and further into the hollow cylinder 7, where it stops, increasing pressure, and effectively increasing the primary portion of the thrust. The stopping of the stream in the mouth 6 provided by preservation of constancy of the moment of the tangential velocity in the vortex motion $W_{\varphi a}=W_{\varphi H}\times r_n/r_a$ where: $W_{\varphi a}$ and $W_{\varphi H}$—the tangential velocities at the entrance and exit of the mouth 6; $r_n/r_a$—radiuses at the entrance and exit of the mouth 6.

Given that the tangential velocities do not affect the loss of thrust from the angle of the opening of the mouth, and the axial velocities are small (5% of the tangential velocities), it is unnecessary to profile the nozzle. Therefore, for the purposes of decreasing its length, it is expedient to widen it, for example, to an angle of 45 degrees (FIG. 3), which simplifies the construction and decreases the nozzle mass.

The following are results of implementing the proposed solution:

1. Excluding high exhaust velocities of the working medium decreases the temperature and fuel consumption and simplifies the construction.

2. Decreasing the expenses increases the fuel utilization coefficient, because less fuel is emitted into the environment.

3. Using tangential and small axial velocities decreases draft loss and excludes the necessity to profile the nozzle 3, which decreases nozzle 3 length and simplifies the construction.

Therefore, the technical result is the development of a subsonic engine with a structurally uncomplicated vortex nozzle and subsonic exhaust velocities of the working medium, which improve the energy-mass characteristics and simplify the construction. This solution opens wide possibilities for using the new engine in numerous field of the national economy.

Although the method and apparatus is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "assembly" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

All original claims submitted with this specification are incorporated by reference in their entirety as if fully set forth herein.

I claim:

1. A method for increasing rocket thrust, comprising: obtaining, by a fuel delivery system (1), a working medium via a nozzle entrance (4) of a nozzle (3), through tangentially placed inlets (5), at a pre-defined speed and twirling with a pre-defined tangential velocity and a pre-defined axial velocity, wherein the tangentially placed inlets (5) are in fluid communication with the nozzle entrance (4) via a an opening defined by the nozzle entrance (4), a nozzle exit that includes a cone-shaped mouth (6), and a hollow cylinder of the nozzle exit (7);
   supplying the working medium to the tangentially placed inlets (5) and the opening so that flow of the working medium is a helical vortex motion between the nozzle entrance (4) and a cone shaped mouth (6) along the hollow cylinder of the nozzle exit (7);
   passing the working medium into the cone-shaped mouth (6) and into the hollow cylinder of the nozzle exit (7), and slowing down, by the hollow cylinder (7), the working medium, thereby increasing pressure and primary portion of the rocket thrust,
   wherein the twirling creates a centrifugal force field in nozzle cavity and leads to creation of excess pressure in the nozzle cavity.

2. The method of claim 1, further comprising: positioning the tangentially placed inlets (5) in a circular configuration a set distance from the axis of thrust of the rocket engine nozzle, wherein the tangentially placed inlets (5) contributes to the working medium flow in the nozzle (3).

\* \* \* \* \*